US012801200B2

(12) United States Patent
Hsieh et al.

(10) Patent No.: US 12,801,200 B2
(45) Date of Patent: Nov. 17, 2026

(54) POWER CONSUMPTION REDUCTION METHOD AND POWER CONSUMPTION REDUCTION SYSTEM

(71) Applicant: MEDIATEK INC., Hsin-Chu (TW)

(72) Inventors: Wen-Wen Hsieh, Hsinchu City (TW); Ying-Yi Teng, Hsinchu City (TW); Chien-Chih Wang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 154 days.

(21) Appl. No.: 18/235,351

(22) Filed: Aug. 18, 2023

(65) Prior Publication Data

US 2024/0152194 A1 May 9, 2024

Related U.S. Application Data

(60) Provisional application No. 63/423,063, filed on Nov. 7, 2022.

(51) Int. Cl.
*G06F 1/3206* (2019.01)

(52) U.S. Cl.
CPC .................................. *G06F 1/3206* (2013.01)

(58) Field of Classification Search
CPC ..................................................... G06F 1/3206
See application file for complete search history.

(56) References Cited

U.S. PATENT DOCUMENTS 11,009,836 B2 * 5/2021 Hoffmann .......... G05B 13/0265
11,449,126 B1 * 9/2022 Lovell ..................... G06F 1/324
2015/0227183 A1 * 8/2015 Carroll ...................... G06F 1/28 713/300
2017/0261949 A1 * 9/2017 Hoffmann ................ G06N 7/01
2018/0181174 A1 * 6/2018 Gangwar .............. G06F 1/3296
2019/0163250 A1 * 5/2019 Lee ..................... G06F 11/3062
2019/0354681 A1 * 11/2019 Hauser .................... G06F 21/81
2020/0249740 A1 * 8/2020 Wei ........................ G06N 20/00
(Continued)

FOREIGN PATENT DOCUMENTS

CN 114268822 A 4/2022
CN 114466331 A 5/2022
CN 114902243 A 8/2022
(Continued)

*Primary Examiner* — Jaweed A Abbaszadeh
*Assistant Examiner* — Ayman Fatima
(74) *Attorney, Agent, or Firm* — Winston Hsu

(57) ABSTRACT

A power consumption reduction method can include defining y operation scenarios according to x types of extracted information, generating z power profiles each used for controlling power provided to a subset of a plurality of processors, assigning the z power profiles to the y operation scenarios in a machine learning model, collecting to-be-evaluated information by the plurality of processors, comparing the to-be-evaluated information with the x types of extracted information to find a most similar type of extracted information, using the machine learning model to select an optimal power profile from the z power profiles according to the most similar type of extracted information, and applying the optimal power profile to control the power provided to the subset of the plurality of processors. The subset of the plurality of processors are of the same type of processor. x, y and z can be an integer larger than zero.

8 Claims, 4 Drawing Sheets

(56) References Cited

U.S. PATENT DOCUMENTS

| | | | | |
|---|---|---|---|---|
| 2023/0079978 A1* | 3/2023 | Bolotin | G06N 3/09 | |
| | | | 713/322 | |
| 2023/0132786 A1* | 5/2023 | Kesavan | G06N 20/20 | |
| | | | 709/220 | |

FOREIGN PATENT DOCUMENTS

| | | |
|---|---|---|
| TW | 202139766 A | 10/2021 |
| TW | 202239246 A | 10/2022 |

* cited by examiner

POWER CONSUMPTION REDUCTION METHOD AND POWER CONSUMPTION REDUCTION SYSTEM

CROSS REFERENCE TO RELATED APPLICATIONS

This application claims the benefit of U.S. Provisional Application No. 63/423,063, filed on Nov. 7, 2022. The content of the application is incorporated herein by reference.

BACKGROUND

As the complexity of applications increases, the requirements for computing power of processing units also increase. According to the current technology, for a multi-core system, as long as the utilization is the same, the same power will be used for power supply.

However, as the operation scenarios become more and more complex, the power saving performance of this power supply method is highly limited. A better solution for reducing power consumption is still in need.

SUMMARY

An embodiment provides a power consumption reduction method. The method can include defining y operation scenarios according to x types of extracted information, generating z power profiles each used for controlling power provided to a subset of a plurality of processors, assigning the z power profiles to the y operation scenarios in a machine learning model, collecting to-be-evaluated information by the plurality of processors, comparing the to-be-evaluated information with the x types of extracted information to find a most similar type of extracted information, using the machine learning model to select an optimal power profile from the z power profiles according to the most similar type of extracted information, and applying the optimal power profile to control the power provided to the subset of the plurality of processors, where x, y and z are integers larger than zero, and the subset of the plurality of processors are of a same type of processor.

Another embodiment provides a power consumption reduction system including a plurality of processors and a machine learning model. The plurality of processors can be used to run a plurality of applications and collect to-be-evaluated information. The machine learning model can have z power profiles corresponding to y operation scenarios according to x types of extracted information. The machine learning model can be linked to the plurality of processors. The machine learning model can be used to compare the to-be-evaluated information with the x types of extracted information to find a most similar type of extracted information, select an optimal power profile from the z power profiles according to the most similar type of extracted information, and apply the optimal power profile to control power provided to a subset of the plurality of processors. x, y and z are integers larger than zero, and the subset of the plurality of processors are of a same type of processor.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
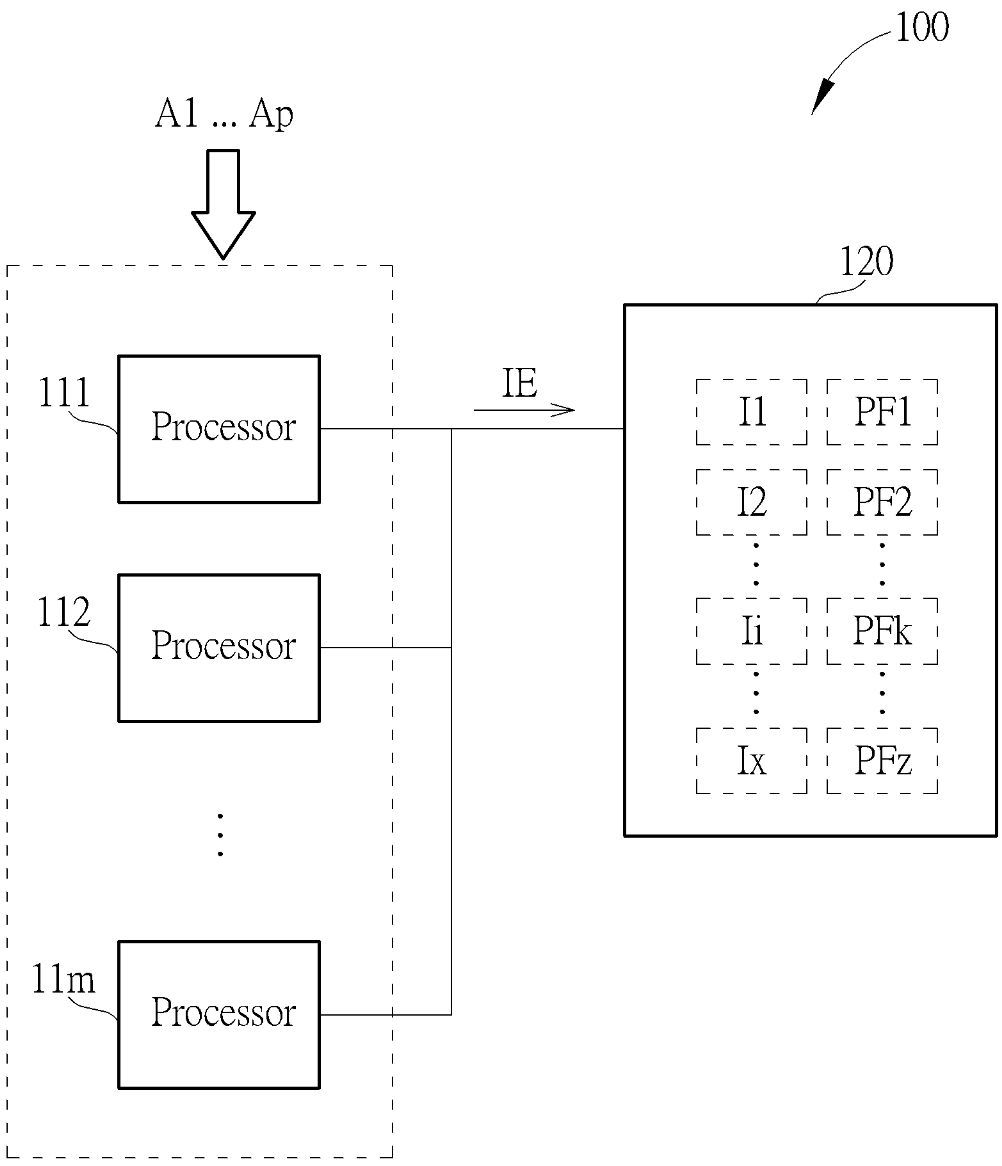
FIG. 1 illustrates a power consumption reduction system according to an embodiment.

FIG. 1 illustrates a power consumption reduction system 100 according to an embodiment. The power consumption reduction system 100 can include a plurality of processors 111 to 11*m* and a machine learning model 120, where m can be an integer larger than zero. The processors 111 to 11*m* can be used to run a plurality of applications A1 to Ap and collect to-be-evaluated information IE accordingly, where p can be an integer larger than zero.

The power consumption reduction system 100 can be a multi-core system where each of the processors 111 to 11*m* can be corresponding to a core. For example, the processors 111 to 11*m* can include two or more different types of cores of processors. For example, the processors 111 to 11*m* can include a big core for heavier workload and a small core for lighter workload. In another embodiment, the processors 111 to 11*m* can include a big core, a medium core and a small core.

The machine learning model 120 can have z power profiles PF1 to PFz corresponding to y operation scenarios (expressed as S1 to Sy) according to x types of extracted information I1 to Ix, where x, y and z can be integers larger than zero, and y≥z.

Some operation scenarios are exemplified as follows: Operation scenario S1 may be playing a video game. Operation scenario S2 may be playing a film on a hard disk. Operation scenario S3 may be accessing a streaming video. Operation scenario S4 may be performing a live stream.

In another example, Operation scenario S1 may be using a browser, Operation scenario S2 may be opening a document file (e.g. a file of Microsoft Office), Operation scenario S3 may be opening a PDF (portable document format) file, and Operation scenario S4 may be opening a three-dimensional image.

The x types of extracted information I1 to Ix can be extracted by detectors, counters and event interfaces in the processors 111 to 11*m*, and more related details will be described in FIG. 2 below.

The machine learning model 120 can include a neural network, a supervised machine learning model, a non-supervised machine learning model, and/or a tree-based machine learning model. For example, the machine learning model 120 can include a neural network(s) such as a fully-connected neural network and/or a convolutional neural network. In another example, the machine learning model 120 can include a tree-based model such as a random forest model. According to embodiments, in the machine learning model 120, any appropriate neural network model (s) can be applied for machine learning.

The machine learning model 120 can be linked to the processors 111 to 11*m* through signal lines and/or wireless paths. According to embodiments, the machine learning model 120 can be linked to the processors 111 to 11*m* through hardware paths and/or software paths.

The machine learning model 120 can be used to compare the to-be-evaluated information IE with the x types of extracted information I1 to Ix to find a most similar type of extracted information Ii from the extracted information I1 to Ix, where i can be an integer and 0<i≤x. The machine learning model 120 can select an optimal power profile PFk from the z power profiles PF1 to PFz according to the most similar type of extracted information Ii. The machine learning model 120 can apply the optimal power profile PFk to control power provided to a subset of the plurality of processors 111 to 11*m* for reducing and optimizing the power consumption. The subset of the plurality of processors 111 to 11*m* are of the same type of processor. For example, the subset of the plurality of processors 111 to 11*m* can be graphical processing units (GPUs). In another example, the subset of the plurality of processors 111 to 11*m* can be central processing units (CPUs).

As described in Table 1, the relationships among the power profiles PF1 to PFz, the x types of extracted information I1 to Ix, and the scenarios S1 to Sy can be shown as below.

TABLE 1

| | | | | | |
|---|---|---|---|---|---|
| Extracted information | I1 | I2 | . . . | Ii (most similar to the to-be-evaluated information IE) | . . . Ix |
| Corresponding scenario | S1 | S2 | . . . | Sj | . . . Sy |
| Corresponding power profile | PF1 | PF2 | . . . | PFk (the optimal power profile) | . . . PFz |
| Note | The optimal power profile PFk is selected and applied to optimize the power consumption. The parameters i, j, k, x, y, z are integers larger than zero. $1 \le i \le x$, $1 \le j \le y$, $1 \le k \le z$, and $y \ge z$. | | | | |

After the optimal power profile PFk is applied, the power consumed by the subset of the plurality of processors 111 to 11*m* can be measured. Ideally, the power consumed by the plurality of processors 111 to 11*m* should decrease after the optimal power profile PFk is applied to optimize the power consumption. However, if the power consumed by the subset of the plurality of processors 111 to 11*m* exceeds a power level with applying the optimal power profile PFk, it implies that none of the power profiles PF1 to PFz is able to reduce the power consumption, the machine learning model 120 can generate a new power profile (expressed as PFnew) and a corresponding new scenario (expressed as Snew) with corresponding new extracted information (expressed as Inew).

The new power profile PFnew can be used to control the power provided to the subset of the processors 111 to 11*m*. If the power consumption reduces with the new power profile PFnew, the machine learning model 120 can learn the new power profile PFnew and the corresponding new scenario Snew with the new extracted information Inew. If required, the new power profile PFnew can be adjusted to further improve the efficiency of power consumption.

In the power consumption reduction system 100, the processors 111 to 11*m* can include a central processing unit (CPU), a graphical processing unit (GPU), a tensor processing unit (TPU), and/or a neural network processing unit (NPU). According to requirements, the processors 111 to 11*m* can include other types of processing units.

The machine learning model 120 can be a machine learning engine implemented with a microcontroller. The machine learning engine(s) of the machine learning model 120 can be implemented in a hardware device (e.g. a specific circuit) and/or with software programs run on a microcontroller.

The x types of extracted information I1 to Ix collected from the processors 111 to 11*m* can be generated using a thermal detector, a current detector, a voltage detector, a bandwidth detector, a performance counter and/or an event interface.

Figure 2:
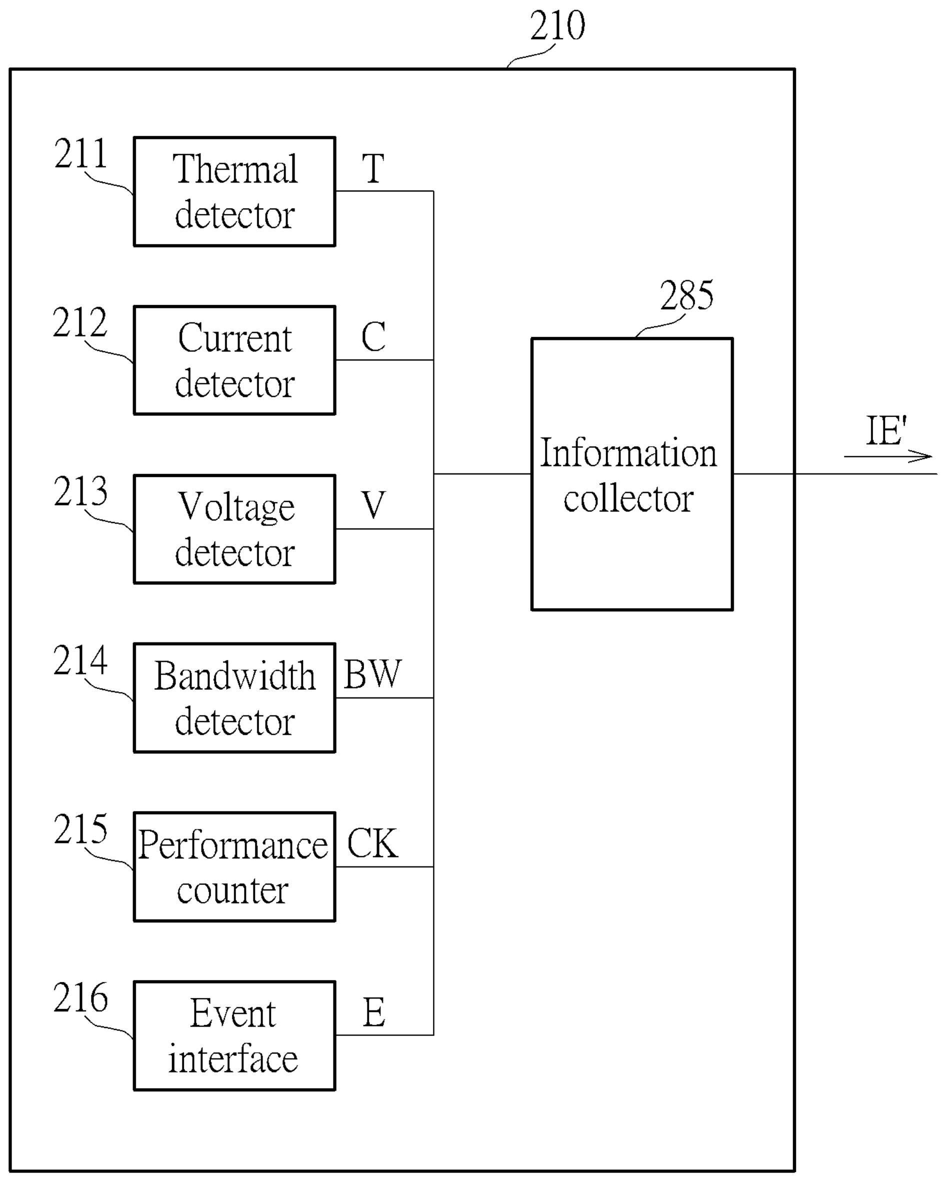
FIG. 2 illustrates a processor according to an embodiment.

FIG. 2 illustrates a processor 210 according to an embodiment. Each of the processors 111 to 11*m* in FIG. 1 can have the structure as the processor 210. The processor 210 can include a thermal detector 211, a current detector 212, a voltage detector 213, a bandwidth detector 214, a performance counter 215 and/or an event interface 216. The thermal detector 211 can detect a temperature T of the processor 210. The current detector 212 can detect a current C of the processor 210. The voltage detector 213 can detect a voltage V of the processor 210. The bandwidth detector 214 can detect a data bandwidth BW of the processor 210. The performance counter 215 can measure a clock CK of the processor 210. The event interface 216 can detect an event E of the processor 210. The data of the temperature T, the current C, the voltage V, the bandwidth BW, the clock CK and/or the event E can be sent to the information collector 285 of the processor 210, and the information collector 285 can aggregate these data to generate the data IE'. The data IE' can be used to form the to-be-evaluated information IE mentioned in FIG. 1. In FIG. 2, the thermal detector 211 to the event interface 216 are all illustrated. However, according to requirements, some of the thermal detector 211 to the event interface 216 can be selectively omitted, and other types of detectors and sensors can be used in a processor to collect data for evaluating the power consumption.

Figure 3:
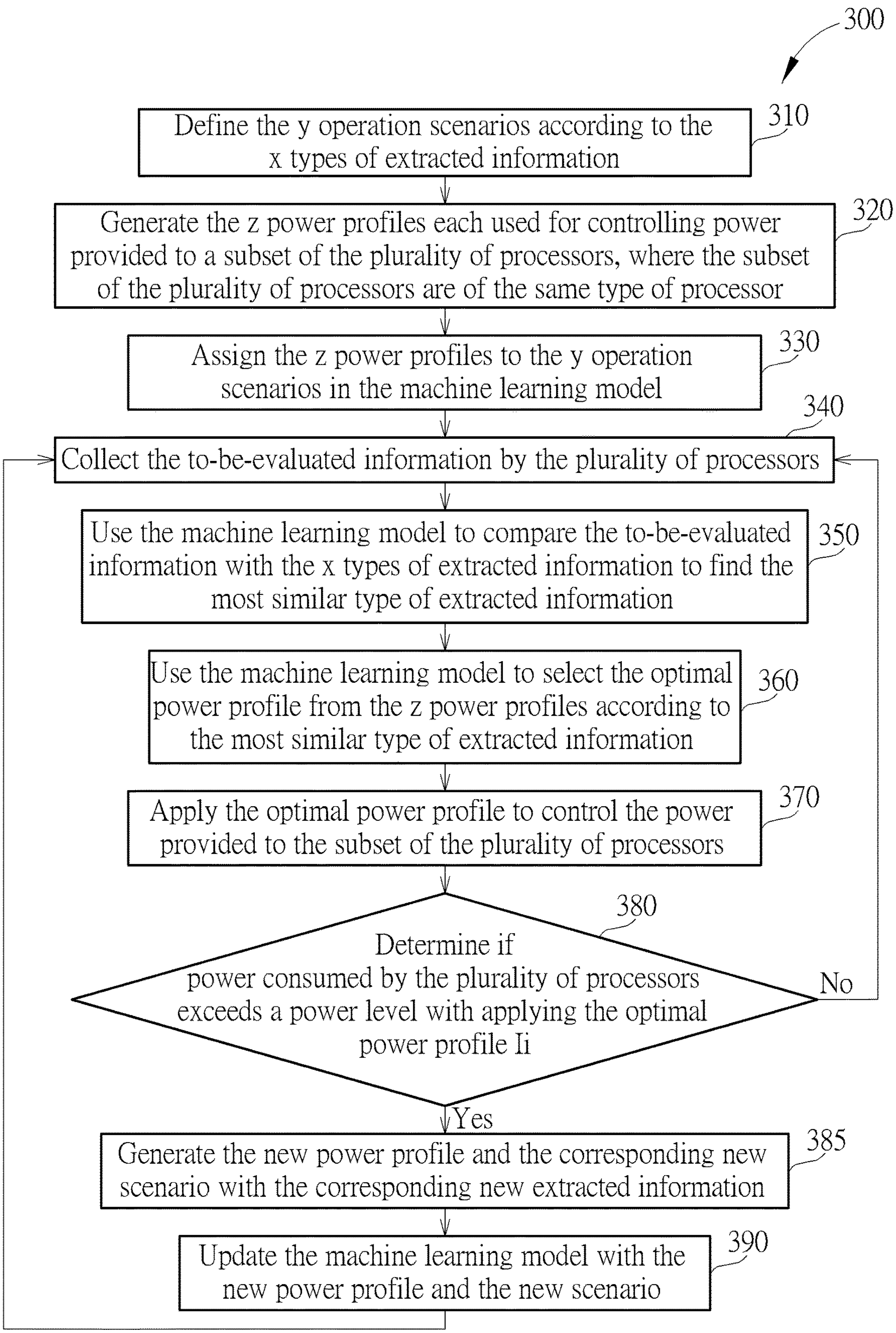
FIG. 3 is a flowchart of a power consumption reduction method according to an embodiment.

FIG. 3 is a flowchart of a power consumption reduction method 300 according to an embodiment. The power consumption reduction method 300 can be performed with the power consumption reduction system 100. The power consumption reduction method 300 can include the following steps.

Step 310: define the y operation scenarios S1 to Sy according to the x types of extracted information I1 to Ix;

Step 320: generate the z power profiles PF1 to PFz each used for controlling power provided to a subset of the plurality of processors 111 to 11*m*, where the subset of the plurality of processors are of the same type of processor;

Step 330: assign the z power profiles PF1 to PFz to the y operation scenarios S1 to Sy in the machine learning model 120;

Step 340: collect the to-be-evaluated information IE by the plurality of processors 111 to 11*m;*

Step 350: use the machine learning model 120 to compare the to-be-evaluated information IE with the x types of extracted information I1 to Ix to find the most similar type of extracted information Ii;

Step 360: use the machine learning model 120 to select the optimal power profile PFk from the z power profiles PF1 to PFz according to the most similar type of extracted information Ii;

Step 370: apply the optimal power profile PFk to control the power provided to the subset of the plurality of processors 111 to 11*m;*

Step 380: determine if power consumed by the plurality of processors 111 to 11*m* exceeds a power level with applying the optimal power profile Ii; if so, enter Step 385; else, enter Step 340;

Step 385: generate the new power profile PFnew and the corresponding new scenario Snew with the corresponding new extracted information Inew; and Step 390: update the machine learning model 120 with the new power profile PFnew and the new scenario Snew; enter Step 340.

The machine learning model 120 can be generated in an off-line state and/or an on-line state where the machine learning model 120 is trained using pre-collected extracted information collected previously. The power consumption reduction method 300 can be performed in the off-line state where the used data can be pre-collected before performing the steps. The power consumption reduction method 300 can be performed in a run-time state where the processors 111 to 11*m* are in operation, and the data used for training the machine learning model 120 can be collected in real time while performing the power consumption reduction method 300.

According to embodiments, some steps of the power consumption reduction method 300 can be performed in an off-line state, and other steps can be performed in an on-line state (a.k.a. run-time state). For example, Steps 310 to 330 of FIG. 3 can be performed in an off-line state, and Steps 340 to 390 can be performed in an on-line state. Here, the processors 111 to 11*m* may not operate in the off-line state, and the processors 111 to 11*m* may operate in the on-line state.

According to the currently running application, the to-be-evaluated information IE can be dynamically updated in Step 340 and be evaluated in Step 350.

In Step 360, the machine learning model 120 can perform classification to select the optimal power profile PFk from the power profiles PF1 to PFz. Since there may be millions of applications, it is not practical to assign a specific power profile for each application. Hence, the machine learning model 120 can perform classification to select an appropriate power profile (e.g. PFk) from a limited number of power profiles (e.g. PF1 to PFz). The classification capability of the machine learning model 120 can be trained.

For example, the machine learning model 120 can be generated to have the z power profiles PF1 to PFz corresponding to the y operation scenarios S1 to Sy according to the x types of extracted information I1 to Ix. Then, in the run-time state where the processors 111 to 11*m* are in operation, the detectors, performance counters and event interfaces can be used to collect the to-be-evaluated information IE for the machine learning model 120 to select the optimal power profile PFk accordingly. Then, Step 370 and Step 380 can be performed to dynamically control the power provided to the subset of the processors 111 to 11*m*. As mentioned in Step 380 and Step 390, if the optimal power profile PFk is unable to reduce the power consumption, the new power profile PFnew can be generated and applied in real time in the run-time state. In Step 385 and Step 395, the machine learning process is performed since the machine learning model 120 can learn the new power profile PFnew and the corresponding new scenario Snew in addition to the z power profiles PF1 to PFz and the y operation scenarios S1 to Sy. After the new power profile PFnew is generated, the new power profile PFnew can be further adjusted and fine-tuned.

Figure 4:
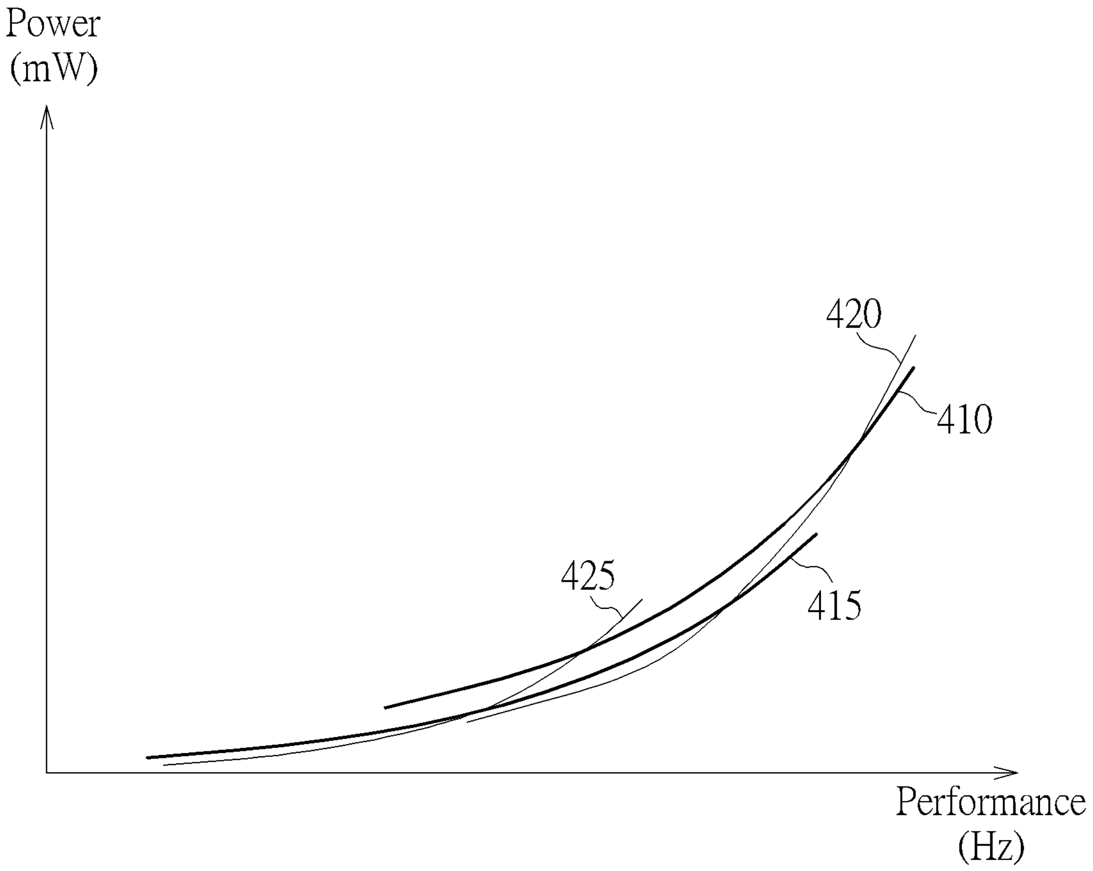
FIG. 4 illustrates the power curves related to different scenarios and processors.

Each of the power profiles PF1 to PFz can be corresponding to performances of the subset of the processors 111 to 11*m*, and the power provided to the subset of the processors 111 to 11*m*. FIG. 4 shows the power curves corresponding to different scenarios and processors according to an example. In FIG. 4, power curves 410, 415, 420 and 425 can be on a two-dimensional space defined with a horizontal axis and vertical axis. The horizontal axis can represent the performance of the processors (e.g. in hertz), and the vertical axis can represent the power consumption (e.g. in milliwatts). In FIG. 4, the power curve 410 can be related to a big core processor and a first scenario with a first workload. The power curve 415 can be related to a small core processor and the first scenario with the first workload. The power curve 420 can be related to a big core processor and a second scenario with a second workload. The power curve 425 can be related to a small core processor and the second scenario with the second workload. An appropriate power profile can be used to control the power provided to the processor accordingly for optimizing the power consumption. FIG. 4 is merely an example, and embodiments are not limited thereto.

In summary, through the power consumption reduction system 100 and the power consumption reduction method 300, the machine learning model 120 is trained to perform machine learning to select an optimal power profile (e.g. PFk) and generate a new power profile (e.g. PFnew) when necessary for different applications. Even if the overall workload is the same, depending on the applications, different power profiles may be selected. For example, the operation frequency of the system can be reduced, while the frame rate (in frame per second) is approximately maintained. Hence, the power consumption is reduced while the performance is maintained. As a result, the power consumption is optimized and effectively reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power consumption reduction method comprising:

generating x types of extracted information from historical data collected from a plurality of processors using a machine learning model, wherein the machine learning model categorizes the historical data into the x types of extracted information, wherein the x types of extracted information are data characteristics extracted from the plurality of processors rather than classifications of a plurality of devices into a plurality of clusters;

defining y operation scenarios according to the x types of extracted information;

generating z power profiles each used for controlling power provided to a subset of the plurality of processors, wherein the subset of the plurality of processors is of a same type of processor and each power profile defines a correspondence between power provided to the subset of the plurality of processors and corresponding performances of the subset of the plurality of processors;

assigning the z power profiles to the y operation scenarios in the machine learning model;

collecting to-be-evaluated information by the plurality of processors;

comparing the to-be-evaluated information with the x types of extracted information to find a most similar type of extracted information from the x types of extracted information;

using the machine learning model to select an optimal power profile from the z power profiles according to the most similar type of extracted information;

applying the optimal power profile to control the power provided to the subset of the plurality of processors;

determining whether a power consumption of the subset of the plurality of processors when applying the optimal power profile exceeds a power level threshold;

generating a new power profile and a corresponding new scenario in response to determining that the power consumption of the subset of the plurality of processors when applying the optimal power profile exceeds the power level threshold, wherein the new power profile and the corresponding new scenario are not generated if the power consumption of the subset of the plurality of processors under the optimal power profile does not exceed the power level threshold;

updating the machine learning model with the new power profile and the new scenario; and after updating the machine learning model, re-collecting new to-be-evaluated information by the plurality of processors, and using the updated machine learning model to select a subsequent optimal power profile from the z power profiles and the new power profile;

wherein x, y and z are integers larger than zero, x, y and z are limited numbers less than a practical threshold for efficient classification, and y≥z.

2. The method of claim 1, wherein each of the x types of extracted information collected from the plurality of processors is generated using a thermal detector, a current detector, a voltage detector, a bandwidth detector, a performance counter and/or an event interface.

3. The method of claim 1, wherein:

the machine learning model is trained in an off-line state and/or an on-line state wherein the machine learning model is trained using pre-collected extracted information collected previously.

4. The method of claim 1, wherein:

the optimal power profile is applied in a run-time state wherein the plurality of processors are in operation.

5. A power consumption reduction system comprising:

a plurality of processors configured to run a plurality of applications and collect historical data, and collect to-be-evaluated information; and a machine learning model having z power profiles corresponding to y operation scenarios according to x types of extracted information, the machine learning model being linked to the plurality of processors, and configured to:

generate the x types of extracted information by categorizing the historical data collected from the plurality of processors into the x types of extracted information, wherein the x types of extracted information are data characteristics extracted from the plurality of processors rather than classifications of a plurality of devices into a plurality of clusters, define the y operation scenarios according to the x types of extracted information, compare the to-be-evaluated information with the x types of extracted information to find a most similar type of extracted information, select an optimal power profile from the z power profiles according to the most similar type of extracted information, apply the optimal power profile to control power provided to a subset of the plurality of processors, determine whether a power consumption of the subset of the plurality of processors when applying the optimal power profile exceeds a power level threshold, generate a new power profile and a corresponding new scenario in response to determining that the power consumption of the subset of the plurality of processors when applying the optimal power profile exceeds the power level threshold, wherein the new power profile and the corresponding new scenario are not generated if the power consumption of the subset of the plurality of processors under the optimal power profile does not exceed the power level threshold, update the machine learning model with the new power profile and the new scenario, and after updating the machine learning model, re-collect new to-be-evaluated information by the plurality of processors, and use the updated machine learning model to select a subsequent optimal power profile from the z power profiles and the new power profile;

wherein the subset of the plurality of processors is of a same type of processor, each power profile defines a correspondence between power provided to the subset of the plurality of processors and corresponding performances of the subset of the plurality of processors, x, y and z are integers larger than zero, x, y and z are limited numbers less than a practical threshold for efficient classification, and y≥z.

6. The system of claim 5, wherein each of the plurality of processors comprises:

a thermal detector configured to detect a temperature of the processor;

a current detector configured to detect a current of the processor;

a voltage detector configured to detect a voltage of the processor;

a bandwidth detector configured to detect a data bandwidth of the processor;

a performance counter configured to measure a clock of the processor; and/or an event interface configured to detect an event of the processor;

wherein the to-be-evaluated information comprises the temperature, the current, the voltage, the data bandwidth, the clock and/or the event.

7. The system of claim 5, wherein the machine learning model includes a neural network, a supervised machine learning model, a non-supervised machine learning model, and/or a tree-based machine learning model.

8. The system of claim 5, wherein the plurality of processors comprises a central processing unit, a graphical processing unit, a tensor processing unit, and/or a neural network processing unit.

* * * * *